United States Patent [19]

Feleus

[11] 4,109,539
[45] Aug. 29, 1978

[54] DYNAMIC POWER BOOSTER

[76] Inventor: Christiaan Cornelis Feleus, P.O. Box 5035, Kent, Wash. 98031

[21] Appl. No.: 798,927

[22] Filed: May 20, 1977

[51] Int. Cl.$^2$ ............................................. F16H 21/38
[52] U.S. Cl. ........................................... 74/36; 74/48; 74/119; 74/125.5
[58] Field of Search ................... 74/47, 48, 36, 63, 69, 74/53, 88, 119, 125.5

[56] References Cited

U.S. PATENT DOCUMENTS

| 543,903 | 8/1895 | Seibert | 74/36 |
|---|---|---|---|
| 1,911,156 | 5/1933 | Laing | 74/119 |
| 2,929,255 | 3/1960 | Colinet | 74/119 |
| 3,869,929 | 3/1975 | Tosi | 74/125.5 X |

FOREIGN PATENT DOCUMENTS 416,314 11/1946 Italy ............................................. 74/47

Primary Examiner—Rodney H. Bonck
Attorney, Agent, or Firm—Nicolaas De Vogel

[57] ABSTRACT

The dynamic power booster is an apparatus which utilizes rotational input power for driving a crank lever in circular rotation. The crank lever drives a pivotally mounted lever assembly, having a first and a second lever slidably connected with one another, in a reciprocating and oscillating movement.

An oscillating arm is movably mounted by its first end portion on the second lever adjacent to the assembly pivot mounting arrangement, and the second end portion of the oscillating arm is attached to one way clutches which are attached to an output shaft.

Upon rotation of the crank lever, the combination lever assembly moves into an oscillating and reciprocating motion and simultaneously oscillates the oscillating arm, which in turn via the one way clutches rotates the output shaft.

The dynamic power booster increases the output torque with a minimum decrease of the output shaft's rotational speed and simultaneously provides for high starting torque and overload torque features without transmitting these overloads back to the input power source.

6 Claims, 11 Drawing Figures

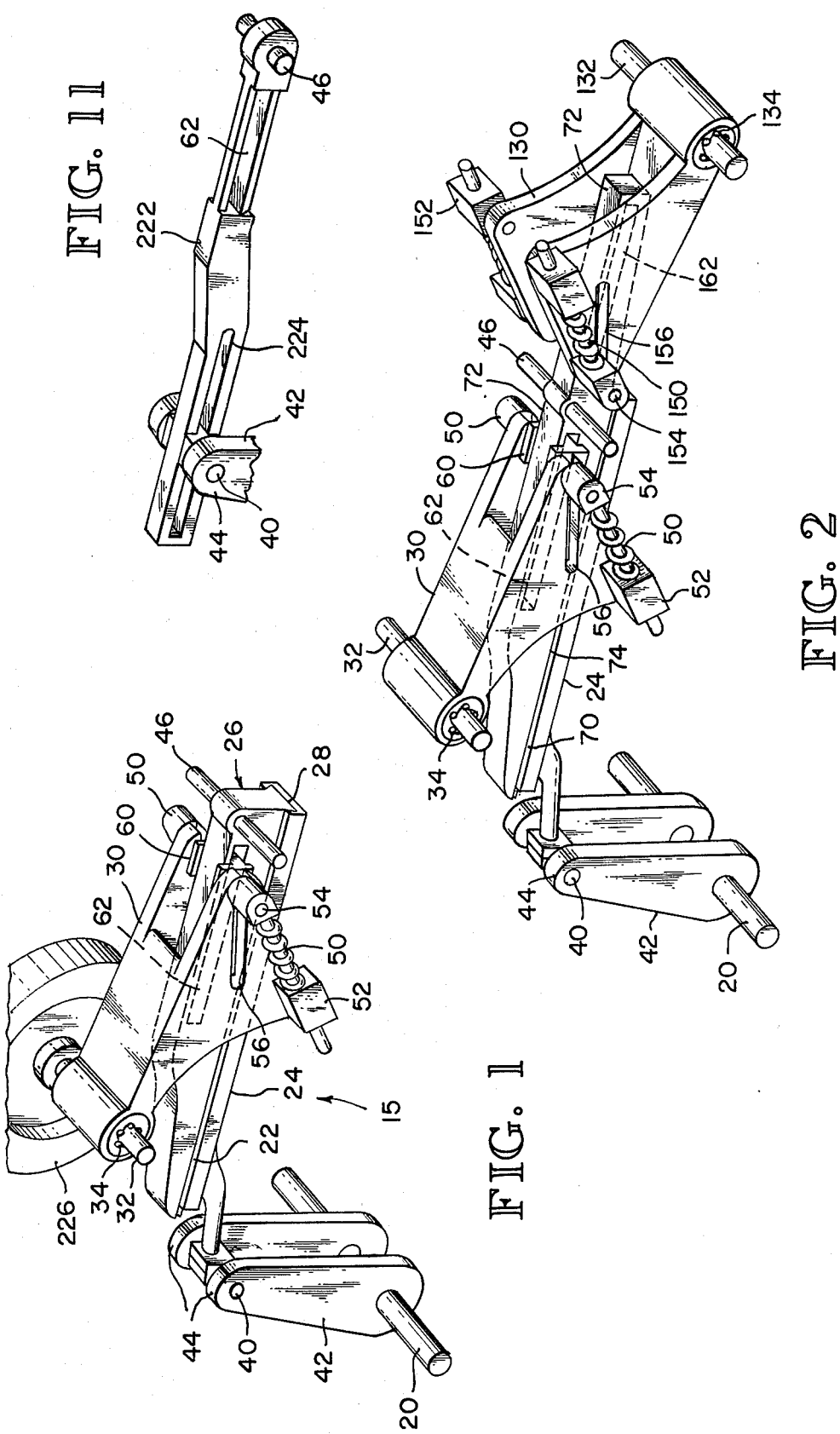

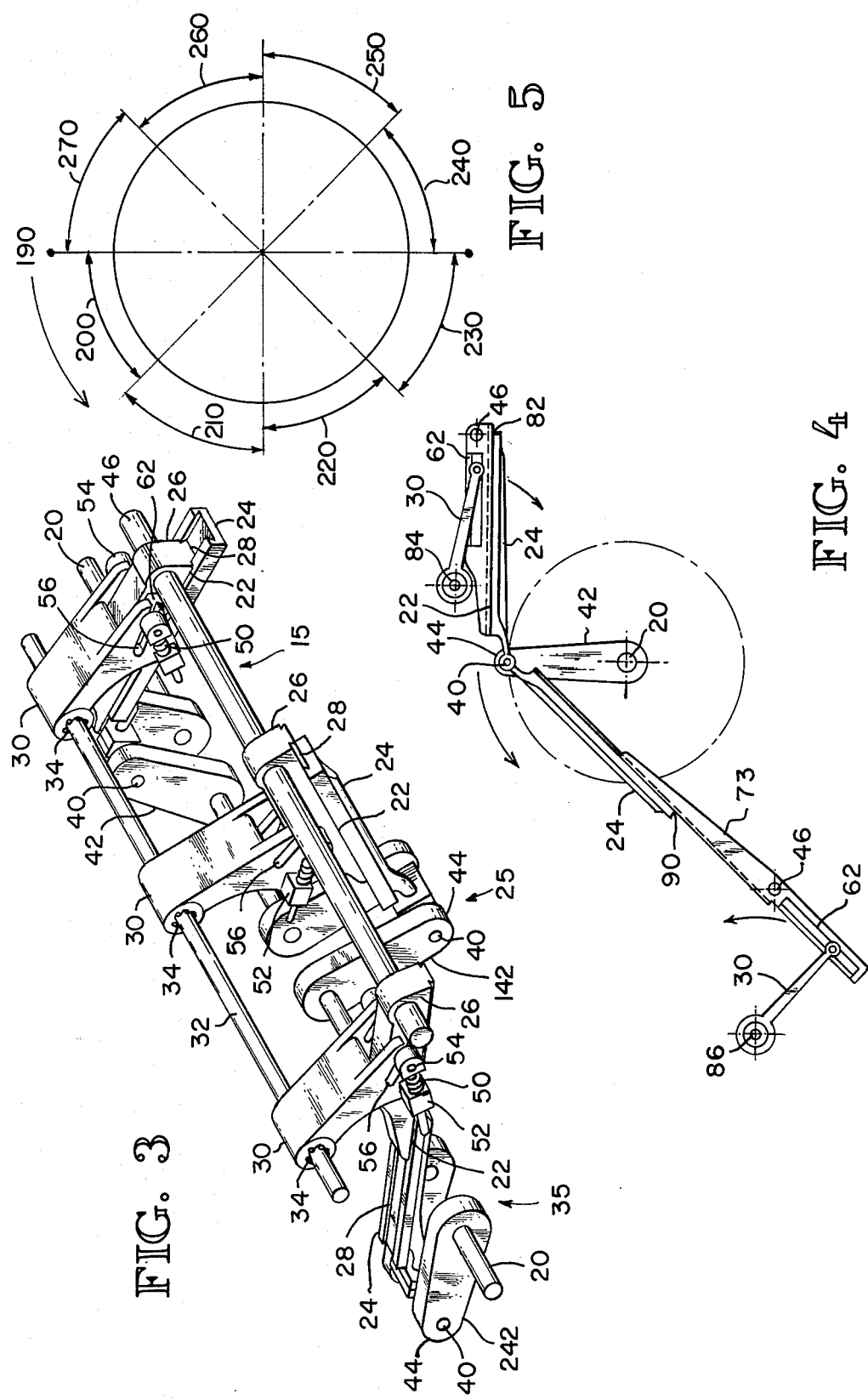

DYNAMIC POWER BOOSTER

BACKGROUND OF THE INVENTION

A. Field of the Invention

This invention relates to dynamic power boosting equipment and, more particularly, to a power booster that provides increased output torque through a unique and novel combination of levers which are functionally and operationally interrelated with one another while maintaining a minimum rotational speed decrease on the output shaft. The purpose of this booster is to decrease the input power requirements provided by existing source equipment operating on natural resources, or in other words, the device will provide a larger output power in comparison to its input power.

B. Description of the Prior Art

Reviewing the existing art, there appears to be various patents concerning power converters and an international search was conducted at the Institute Internationale Des Brevets (IIB) in The Hague, The Netherlands, as well as a novelty search in the U.S. Patent and Trademark Office. It was found that the most interested art relative to the present invention was to be a French Pat. No. 2,146,099, issued to Arduino Tosi, and issued in the United States to Arduino Tosi as U.S. Pat. No. 3,869,929 on Mar. 11, 1975.

In general, the basic design of most power converters of the type discussed herein do involve transmission devices wherein single levers are used as the principal torque increasing components and are combined with cogged wheels and cogged wheel segments installed in such a way that the output shaft speed, lost by that single lever, is to be regained again at cost of the torque just increased by the single lever or torque converters that reduce the output shaft speed on a one to one inversed ratio, compared with the torque increase of the output shaft, utilizing parallel shafts that are interrelated to one another by single lever means which are installed alongside each other and do operate one way clutch means installed on an output shaft, for a predetermined purpose that differs from the purpose of the present invention.

The present invention improves over the prior art through installation of an oscillating arm installed with its first end portion movably mounted on the first lever of the combination lever assembly and the second end portion of the oscillating arm attached to the one way clutch which is mounted on the output shaft.

A multi embodiment version of the present invention, with the embodiments positioned side by side in such a way that the one way clutches are engaging the oscillating arms with a mutual output shaft in a predetermined consecutive sequence, will provide a constant rotating output shaft speed 2.9 times less than the rotational input shaft speed, and will provide a minimum output torque at the output shaft of 5 times higher than the input shaft torque (as was found in a reduction to practice device).

In addition to U.S. Pat. No. 3,869,929, the following prior art inventions were also found to be of interest to this invention:

U.S. Pat. No. 3,206,991, patented Sept. 21, 1965, to Jerry J. Lines and Dale D. Kloss. Subject: Variable Speed Power Transmission. This prior art apparatus is built to reduce speed with the additional feature of having the capability to vary the output shaft speed without engaging and disengaging any of the internal components. The main shafts are interconnected with single rocker arm means which are to transform the higher rotational input shaft speed to a lower rotational output shaft speed. The present invention differs from the prior art in that it is to function at the highest possible shaft speed combined with a maximum torque increase.

U.S. Pat. No. 3,557,631, patented Jan. 26, 1971, to Arvid Dahlstrom. Subject: Speed Reducing Mechanism. This prior art invention has also its components positioned for the purpose of reducing the input speed with a single lever type design while the present invention has its components designed and positioned for the purpose of maintaining the highest possible speed at the output shaft combined with an increased output torque compared with the torque provided by the input source.

U.S. Pat. No. 3,646,822, patented Mar. 7, 1972, to Luis Alberto Pocaterra. This prior art apparatus has its components designed and positioned in such a way that power and speed ratio are in strict inversed ratio related to each other, on a one for one basis. Any change required to output speed and output power requires an additional outside source to accomplish that required change.

This invention, meaning the dynamic power booster, improves over the prior art apparatus with respect to the speed to power ratio, which is, for example, the input speed divided by 2.9 equals the output speed and, in that same example, the output torque is better than 5 times the input torque. Furthermore, this invention is not depending on an outside source for adjustment since this invention reacts automatically when the shaft becomes subjected to overloading; the power will immediately increase to compensate without passing that overload burden first on to the input power source means. U.S. Pat. No. 3,772,926, patented Nov. 20, 1973, to Mohanjit S. Sidju and Donald E. Landis. Subject: Eccentric Drive Mechanism. This prior art apparatus is designed to have its output shaft rotation minimized to intermittent movements to improve the functional purpose of a specific number of components which are positioned in a specific installation.

This prior art apparatus will not be able to provide uninterrupted rotation with a minimum decrease of speed of the output shaft, nor will it provide a compensating high starting torque in a manner compared with the power booster per this invention.

U.S. Pat. No. 3,930,416, patented Jan. 6, 1976, to Arvid Dahlstrom. Subject: Laminated Drive Arms for Speed Reducer. This prior art apparatus has the construction of its levers improved from solid structured levers to solid laminated structured levers, and its one way clutch means was improved as to its maximum capacity. This prior art apparatus is further the same as U.S. Pat. No. 3,557,631, also to Arvid Dahlstrom and also discussed herein, therefore the same comparing definition as given for U.S. Pat. No. 3,557,631 applies to this prior art apparatus.

The ability to produce high torque output combined with a low speed decrease is accomplished by a unique and novel solution explained hereinafter.

SUMMARY OF THE INVENTION

The present invention applies to all installations using natural resources for their operational purposes.

The dynamic power booster comprises a base structure for mounting the power booster to a receiving foundation. Attached to the base structure is upright structure providing bearing support for the main shafts while the booster can be further enclosed to comply with specific requirements. The preferred embodiment of this invention is constructed in such a way that a predetermined number of embodiments can be installed parallel and adjacent to each other on mutual main shafts, identified as: first fixed pivot point, second fixed pivot point and output shaft. In a multi embodiment version of the power booster, the components should be positioned so that the one way clutch means are engaging the oscillating arms with the output shaft in a predetermined consecutive sequence.

The component, identified in this invention as an oscillating arm, is equipped with shock absorbing means. These shcok absorbing means are simultaneously functioning as deadlock prevention means, which is an occurrence at the moment that the first end portion of the oscillating arm is at its greatest distance away from the second fixed pivot point. It is at that moment that the parts that integrate the oscillating arm with the second lever of the combination crank lever assembly are pushed into sleeves in the oscillating arm by the second lever, and thereby simultaneously compressing spring means installed between the parts that integrate the oscillating arm with the second lever and the parts pivotally installed on the oscillating arm.

After completion of the first swing of the oscillating arm and prior to its return swing, an angle of inclination is formed between the longitudinal centerline of the spring means and the upward moving second lever. When this angle of inclination is sufficiently decreased in size by the second lever, the spring means will expand itself and will thereby return the oscillating arm to its position of origination.

The position selected for the locations of the first fixed pivot point, the second fixed pivot point and the output shaft in relation to each other was determined as a result of providing the most functional location for the oscillating arm in relation to the operational movement of the second lever of the combination crank lever assembly as shown in larger scale in FIGS. 6, 7, 8 and 9 of this invention.

In viewing FIG. 1 of this invention, a second most functional location can be established. Using FIG. 2 of this invention to define that location, we will assume an imaginary straight line through the center of the output shaft and the second fixed pivot point and having that line extend an equal distance to the right of the second fixed pivot point, it is on that line and on the righthand side of the second fixed pivot point that a second oscillating arm can be installed in upside down and opposite position from the position shown in FIG. 1. This will also provide a location for a second output shaft also positioned on that imaginary line. To support this second embodiment, the second lever of the combination crank lever assembly is to be extended to the right of the second fixed pivot point to provide for a movable attachment of the first end portion of the newly positioned oscillating arm to the extended portion of the second lever of the combination crank lever assembly.

In an effort to express in proportion the value of this novel invention, the following simplified example is presented:

Assume we want to boost the output of a 10 HP motor capable of making 3600 revolutions per minute and that this motor is connected to the first fixed pivot point of this invention. The crank pin will then also turn at a speed of 3600 RPM. The torque at the crank pin is 26.933 ft/lb. At the point of contact of the first end portion of the oscillating arm with the second lever, we have then 102 ft/lb torque. The location of the oscillating arm is when its first end portion is at the maximum distance away from the second fixed pivot point. The speed of travel of the oscillating arm is now 2.9 times less than the 3600 RPM of the crank pin. It is now found that, in this example, we will have an output torque of 1530 ft/lb at 1241 revolutions per minute.

Existing laws tell us that it is impossible to get more power as output than there is provided by the input source. The above example is no exception to that law considering the following comparison:

At the first fixed pivot point we have:
A Basic torque
B Basic speed
C Distance travelled per unit of time at the input shaft (taken at a point on the radius of the input shaft).

At the output shaft we have then:
D Torque larger than the input torque
E Speed 2.9 times lower than the input speed
D Distance travelled per unit of time. This too is far less than the distance travelled by the input shaft. (360° versus 30° during clutch engagement)

Conclusion: In all known cases of similar art it is found that the speed to power relationship remains a one for one inversed ratio.

This invention has a 2.9 speed decrease factor and a 5.7 torque increase factor. The rotational distance travelled by the output shaft is also of value, since that is less than the distance travelled by the input shaft. To compensate for this difference, a multi embodiment type power booster, that has its one way clutch engagements positioned in a consecutive sequential order, thus ensuring that the output shaft will rotate continuously during operation of the power booster.

Additional solutions for maintaining a constant speed are possible such as a combination of embodiments with a flywheel added.

In summary, the features which are unique to the subject invention are: the torque increasing capability and the non-proportional inversed shaft speed ratio compared with that torque increase. The novel capability of this invention will minimize, and for many installations, eliminate, the requirements for natural resources to be used as fuel or as power supply; thereby simultaneously minimizing, and in many cases eliminating, air pollution problems.

It is therefore an object of the present invention to provide a dynamic power booster which delivers a maximum torque increase with a minimum speed decrease consisting of embodiments designed and arranged to comply with the specific performance requirements of the subject installation into which this booster is to perform as an integrated unit.

It is another object of the present invention to provide a dynamic power booster for attachment to a power source for the purpose of increasing the torque by means of a unique and novel combination of lever means functionally interrelated to one another having these lever means pivotally mounted on shafts of predetermined size and having these shafts positioned in a stationary, parallel manner in relation to each other and supported by a framework designed to provide maximum support to ensure that the components will meet the functional, operational interrelationships and physical interdependent requirements established for each specific designated power booster category.

Objects and advantages will become further apparent from the following description presented in conjunction with the accompanying drawings, hereinafter defined in further detail.

BRIEF DESCRIPTION OF THE DRAWINGS

FIG. 1 is an isometric view of the dynamic power booster.

FIG. 2 is an isometric view of the dynamic power booster in a second preferred embodiment with two oscillating arms which are operated by one combination crank lever assembly.

FIG. 3 is an isometric view of the dynamic power booster in a multi embodiment version.

FIG. 4 is a diagramatic elevational view of a third preferred embodiment consisting out of two dynamic power boosters operated by one first fixed pivot point and pivotally mounted on separate crank pins with each crank pin having its own crank levers.

FIG. 5 shows a circular diagram representing the pathway of travel of the crank pin around the first fixed point. The circular diagram is subdivided into four segments to define the operational stages of the components.

FIG. 6 is a side elevation view of the dynamic power booster at the point of engaging the one way clutch.

FIG. 7 is a side elevation view of the power booster with the one way clutch engaged and with the crank pin 90° advanced.

FIG. 8 is a side elevation view of the dynamic power booster with the one way clutch at the point of disengaging and the oscillating arm at its greatest distance away from the second fixed pivot point.

FIG. 9 is a side elevation view of the dynamic power booster showing the return of the oscillating arm with the one way clutch disengaged.

FIG. 11 is a one lever means.

DESCRIPTION OF THE INVENTION

Figure 6:
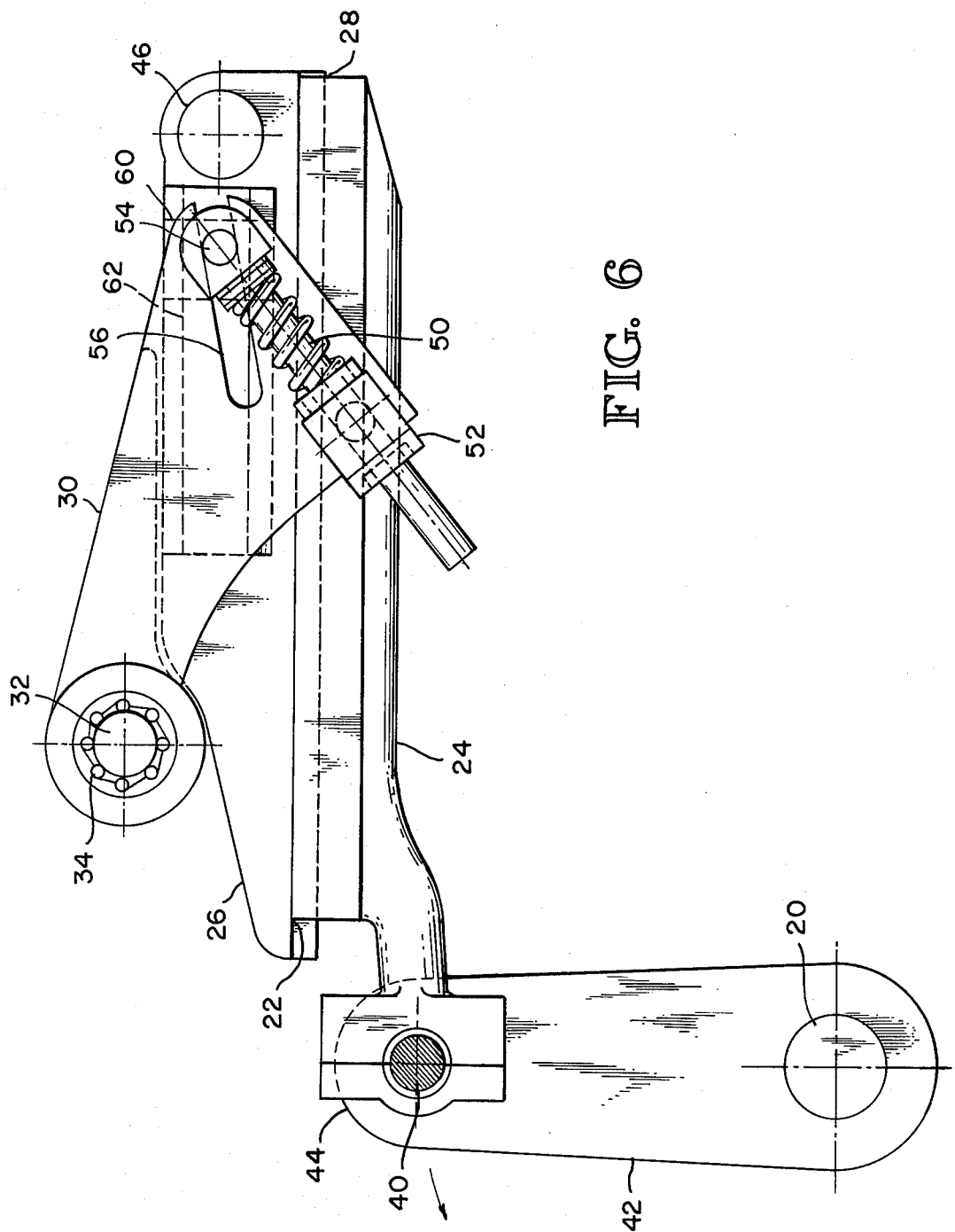
FIGS. 6-9 show 360° rotation in 0° - 90° - 135° - 270° - increments successively.
Figure 7:
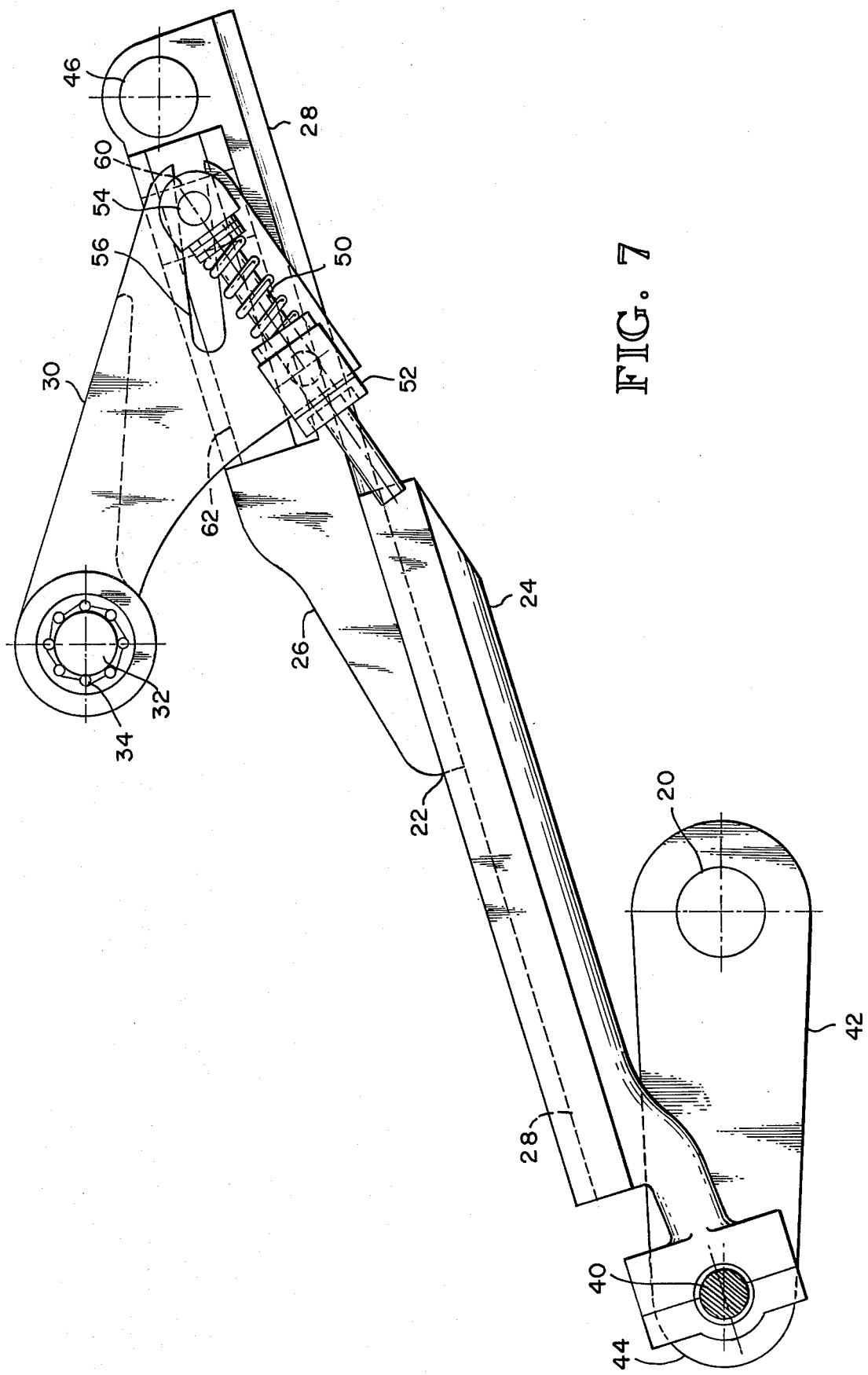
Figure 8:
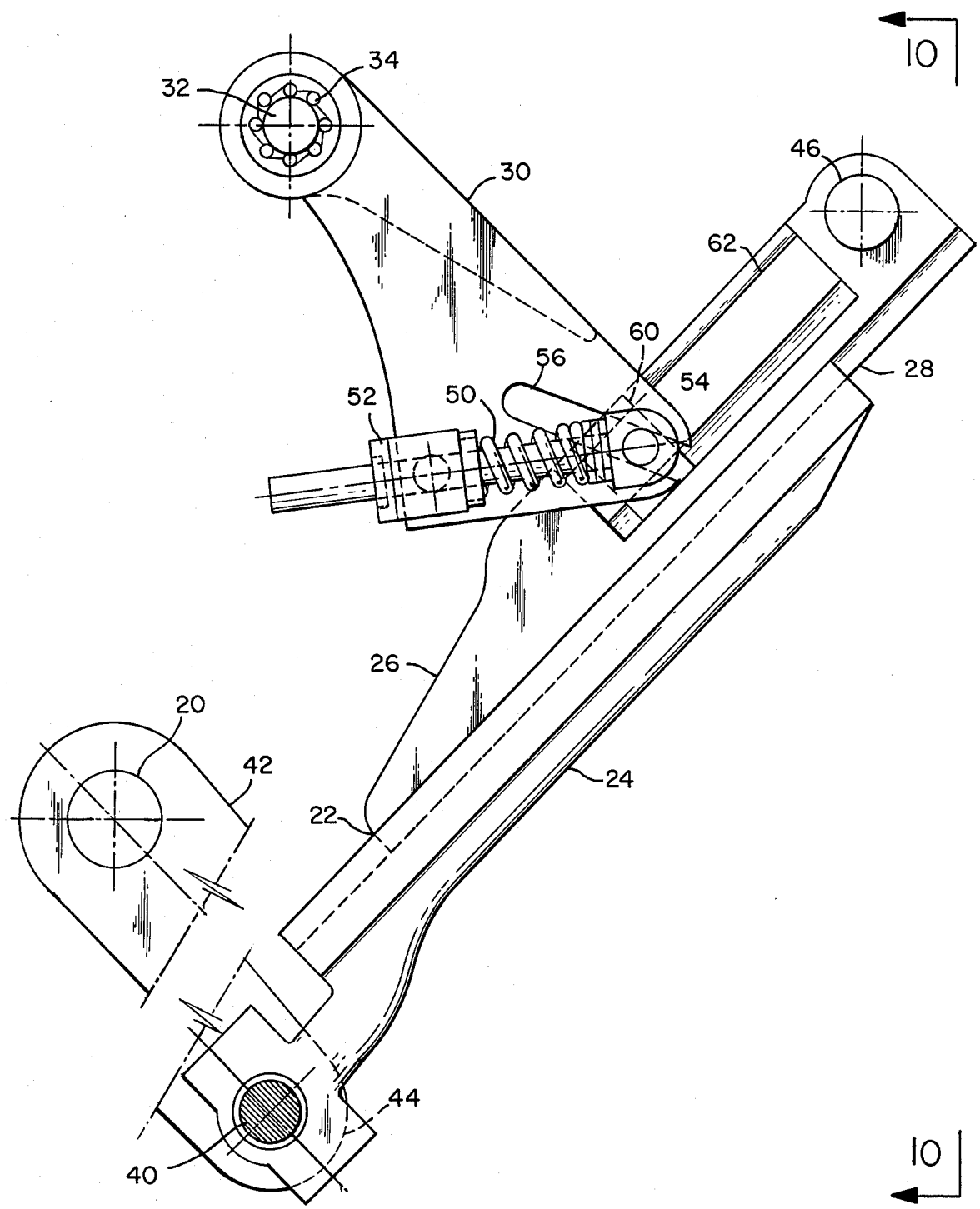
Figure 9:
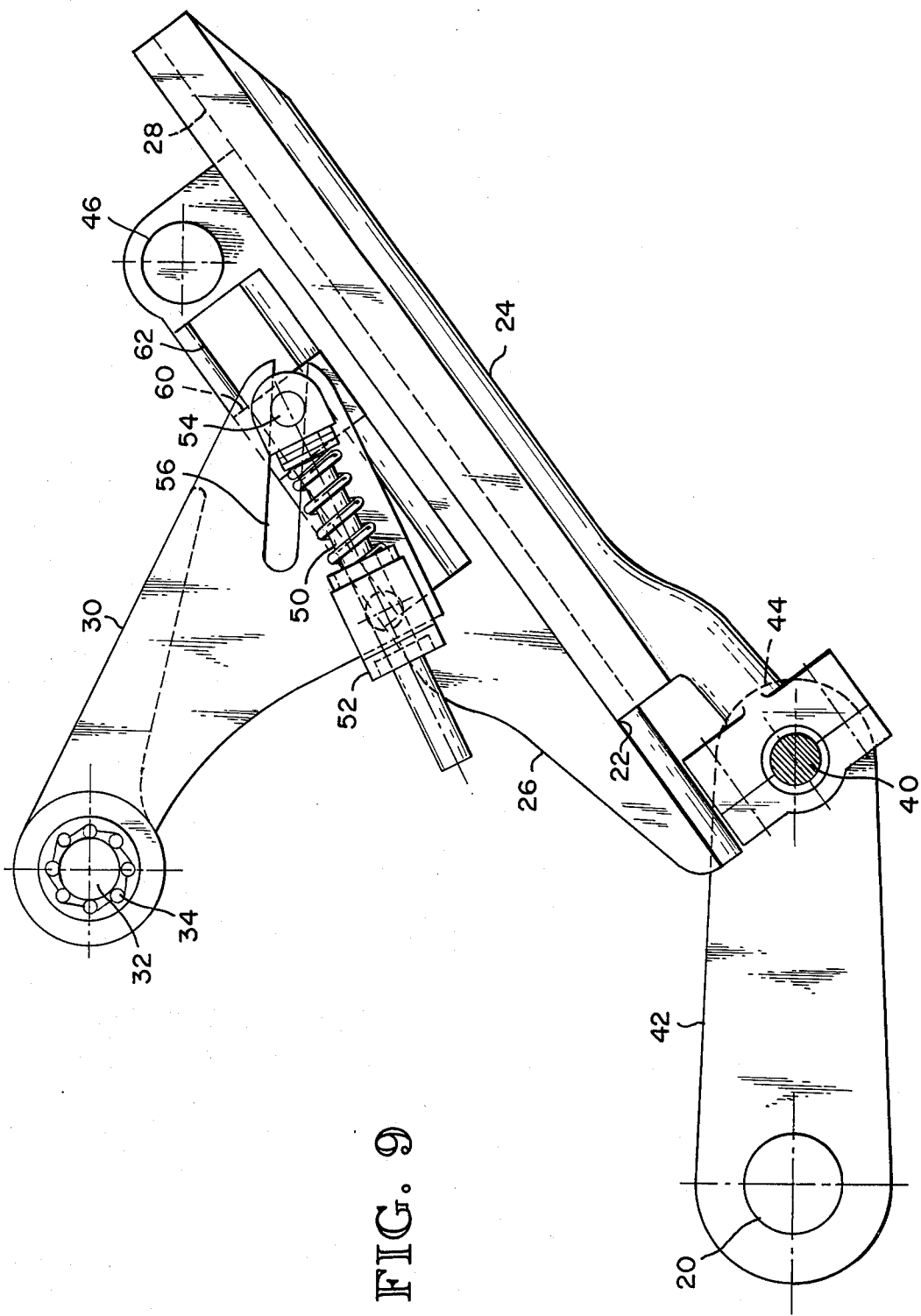
Figure 10:
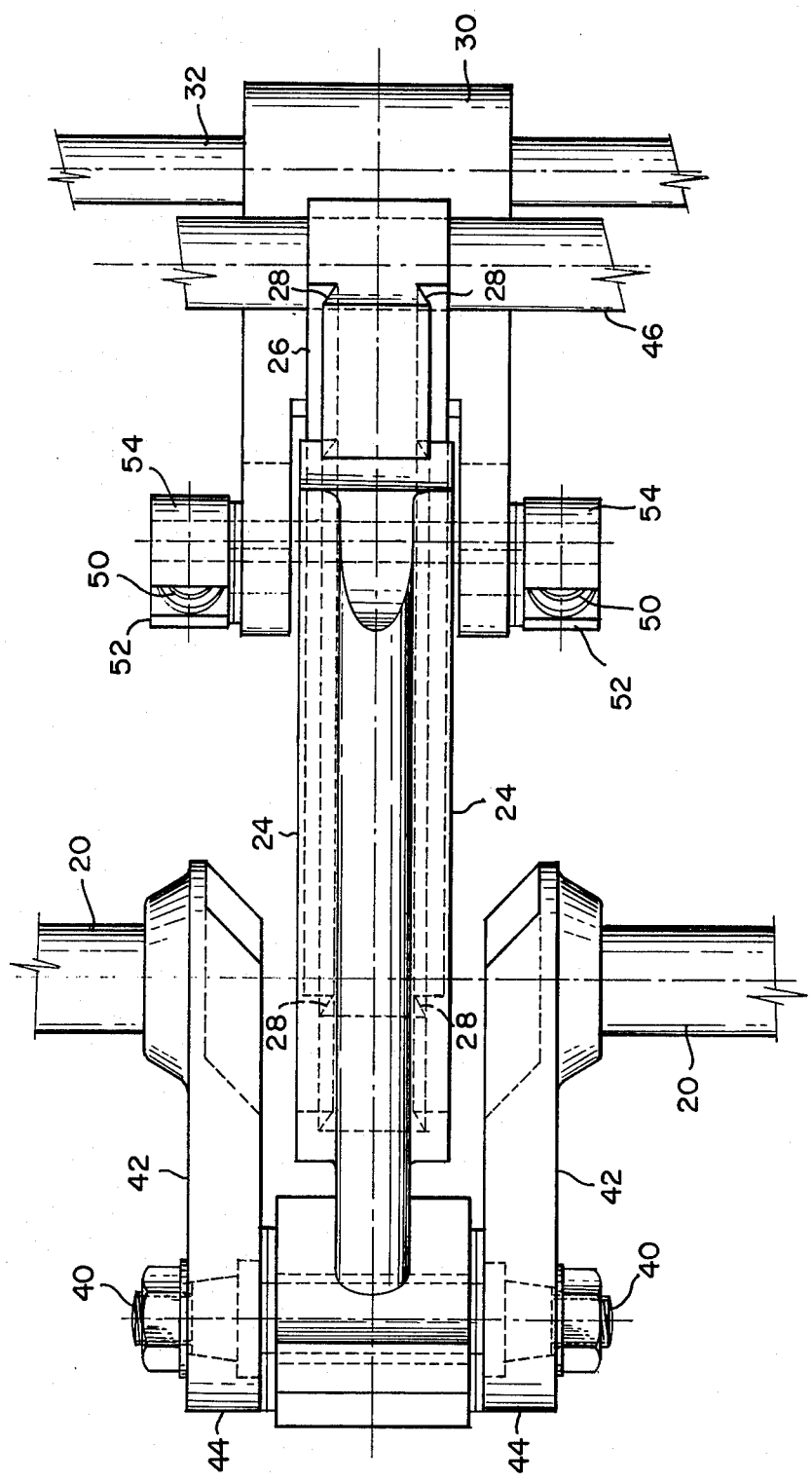
FIG. 10 is an end elevation view of the dynamic power booster with the crank pin in the lowest position and is an elevational end view along line 10—10 of FIG. 8.

The drawings of this invention do illustrate by way of example, and not by all possible combinations of embodiment arrangements of this invention and not by way of limitation, four forms of the embodiment of this invention wherein like reference numerals designate corresponding parts in the several views.

With reference to FIGS. 1-4 and 6-10, there is illustrated a dynamic power booster 15 consisting mainly of a first fixed pivot point 20, a combination lever assembly 22 which includes a first lever 24 and a second lever 26 integrated with each other by sliding means 28. This combination lever assembly 22 operates an oscillating arm 30 responsible for rotating the output shaft 32 via the one way clutch means 34.

The dynamic power booster 15 per this invention is normally composed of a predetermined number of embodiments arranged to facilitate specific requirements as shown in FIGS. 1, 2, 3 and 4 on the drawings of this invention and having the selected arrangement of embodiments integrated with one another into one apparatus positioned in a structural enveloped design in compliance with specific requirements.

The components of this invention can be designed to dimensions complying with any size installation mechanically operated.

FIG. 1 represents the basic configuration wherein a crank lever 42 is driven by an associated power means (not shown) via the first fixed pivot point 20 or pivot axle connection. On the end portion 44 of the crank lever 42 is a crank pin 40 which upon rotation extends and contracts the lever assembly 22 by the sliding of the first lever 24 along the second lever 26 via its sliding means 28, thus providing an oscillating movement about the second fixed pivot point 46.

The oscillating arm 30 is equipped with shock absorbing means 50 to prevent the oscillating arm 30 from deadlocking when the oscillating arm 30 forms an angle of 90° with the second lever 26.

The shock absorbing means 50 are pivotally and slidingly positioned on the sides of the oscillating arm via angle or part 52. The upper end portion of the shock absorbing means 50 is held in position with pin means 54 slideably installed in sleeves 56 made in the oscillating arm 30. The pin means 54 are simultaneously utilized as pivoting connecting means between the oscillating arm 30 and second lever 26 via guide means 60 slidingly positioned in receiving means 62 provided in the second lever 26.

FIG. 2 is partly a similar arrangement as in FIG. 1 except for the combination lever assembly 22 which is replaced by a lever assembly 70 having a first lever 24 and a second extended lever 72 combined by sliding means 74.

A similar oscillating arm 30 with the one way clutch 34 and the output shaft 32 are utilized in combination with a second arrangement, and are identified in this second embodiment as an oscillating arm 130, a one way clutch 134 and output shaft 132, respectively. Also, the arrangement of the second shock absorber means 150, part 152, pin 154, and sleeve 156, and receiving means 162 operating similar as the shock absorbing means 50, shown and explained for FIG. 1.

FIG. 3 is a combination which shows a basic power booster 15 connected side by side with power boosters set 25 and a set 35 having crank levers set 42, 142 and 242, respectively, each positioned apart a predetermined distance about the first fixed pivot point 20. Other such engine embodiments may contain any plurality of power boosters, preferably evenly spaced about 360°.

FIGS. 6-9 do represent the embodiment of this invention with the crank pin 40 in different positions of its circular pathway during an operation cycle defined as follows:

FIG. 6 has a crank lever 42 and the crank pin 40 positioned at the moment of engaging the one way clutch means 34 or third fixed pivot point, while the crank pin 40 will proceed in counter clockwise rotational direction (see arrow) about the first fixed pivot point 20 at the same time. This will move the first lever 24 in the same direction as the crank pin 40. This increases the overall length of the combination lever assembly 22 and will provide the leverage that is needed to regain the leverage lost by the length of the crank lever 42. The unique and novel position of the oscillating arm 30 in relation to the second lever 26 will increase the leverage built up to the required output power transmitted to the output shaft 32 via the one way clutch means 34.

The circle shown in FIG. 5 represents the pathway of travel of crank pin 40 about the first fixed pivot point 20. The circle is subdivided into 8 segments of equal size. Each segment is numbered in the same sequence as crank pin 40 travels, starting at the point at which the one way clutch means 34 is about to engage. This moment is identified in FIG. 5 as 190. As the crank pin 40 moves through segment 200 (see FIGS. 6-9), the first lever 24 will oscillate slower and slide faster outward from the second lever 26. In segment 210 and 220, the first lever 24 and the second lever 26 will oscillate at their maximum speed and in the maximum length; it is at this time that the maximum torque is developed in the oscillating arm 30. As crank pin 40 moves through segments 230 and 240, the first lever 24 will slide faster inward on the second lever 26 and oscillate slower; it is at this time that the oscillating arm 30 (see FIGS. 1, 2, 3 and 4) will increase its oscillating speed as a result of the unique angular position of the center of oscillation on output shaft 32 in relation to the second fixed pivot point 46.

At the end of segment 240, the one way clutches 34 will disengage as the oscillating arm 30 moves in opposite direction and returns from whence it came.

The diagram shown in FIG. 5 applies also to the other embodiments shown in FIGS. 2-4 of this invention. Of course, the operational events for the lower left embodiment in FIG. 4 are the same as described heretofore and do occur at a distance 180° away from the operational events described and identified as segments 200, 210, 220, 230 and 240 in FIG. 5.

The second combination lever assembly 90 of the lower left embodiment in FIG. 4 is installed in upside down position compared with the upper lever assembly 82. The embodiment shown in FIG. 4 of this invention with two output shafts 84 and 86 are capable of providing at each single output shaft the same power as a single embodiment version (shown in FIGS. 1, 2 and 3) will provide with one output 32, without changing the input power source that would be required for the single embodiment version as shown in FIGS. 1, 2 and 3 of this invention.

Lever 73 in FIG. 4 is similar to lever 72 as positioned in FIG. 2 with a slightly modified outside contour to permit right side up installation of the additional oscillating arm 30.

It is essential to retain the single embodiment version shown in FIGS. 1-3 of this invention for reasons of overcoming possible limited availability of installation area and ceiling height restraints and other specific requirements unknown at this time.

FIG. 11 shows a one lever means 222 which may substitute the lever assembly 22 and is provided with a slot 224 so that the crank pin or pivot point on the crank lever 42 can pivot and slide. The result will be that the lever means 222 would oscillate just like the lever assembly 22.

Also there is shown a flywheel 226 in FIG. 1 which, of course, would convert the intermittent rotation of the output shaft 32 into a continuous rotation.

In summary, the generic present invention of the dynamic power booster comprises a crank lever means having a first fixed pivot point and an associated power source for rotating the crank lever means about the first fixed pivot point, and there is a pivot point positioned at a predetermined distance from the first fixed pivot point on the crank lever means. In addition, there is a lever means having a first and a second end portion, the first end portion is slideably and pivotably connected to the pivot point on the crank lever means, and there is a second fixed pivot point connected to the second end portion of the lever means. A sliding pivot means is located at a predetermined position between the first pivot point and the second fixed pivot point. Finally, there is a third fixed pivot point which incorporates a one way rotating means and an oscillating arm means which is connected between the one way rotating means and the sliding pivot means on the lever means. The output of the power booster is on an output shaft means which is connected to the one way rotating means. Upon actuation of the associated power source, the crank lever means is rotated and moves the lever means by the pivotable and slideable pivot point connection in an oscillating motion about the second fixed pivot point, thereby oscillating the oscillating arm means via the sliding pivot means about the third fixed pivot point incorporating the one way rotating means for imparting an intermittent rotation to the output shaft means. A larger torque than the associated power source input torque at the first pivot point will be produced on the output shaft of the booster.

The preferred embodiment of the dynamic power booster (see FIGS. 1, 6-10) has a crank pin connected to the crank lever end portion and a lever assembly with a first lever slideably connected by sliding means to a second lever. The first lever is connected to the crank pin. A second fixed pivot point at the second lever and a sliding guide means is positioned between the sliding means of the lever assembly and the second fixed pivot point, while a one way clutch takes the place of a third fixed pivot point, similar to the one way rotating means in the generic description. An oscillating arm is connected to the one way clutch at one end and arranged in cooperating connection with the sliding guide means at its other end.

In addition to the preferred dynamic power booster the sliding guide means is provided with pin means for connection to the oscillating arm and shock absorbing means are pivotally connected to the pin means and mounted on the oscillating arm for preventing a dead lock condition of the oscillating arm with the lever assembly. Furthermore, flywheel means or the like may be provided for converting the intermittent rotation into a continuous rotation.

The dynamic power booster (as per FIG. 2) provides for an additional sliding guide means on the second lever opposite of the sliding guide means and separated in aligned arrangement and distance by the second fixed pivot point, and an additional oscillating arm is connected to the additional sliding guide means and to an additional one way clutch which forms a fourth fixed pivot point provided with an additional output shaft. Of course, both output shafts could be connected together via transmission means not shown.

A most preferred embodiment is the engine configuration or dynamic power booster (as shown in FIG. 3) wherein the dynamic power booster is connected mechanically in series to form a plurality of dynamic power boosters, and wherein the first, second and third fixed pivot points are each congruently aligned and in parallel alignment with one another, and wherein each of the plurality of power boosters is connected at the first fixed pivot point at predetermined degrees of separation from one another, and wherein the output shaft of each booster is integrally connected to a common output shaft for providing a continuous high torque output rotation.

The dynamic power booster as shown in FIG. 4 is connected mechanically in combination with one or more of the same dynamic power boosters congruently about the first fixed pivot point at predetermined degrees of separation.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. A dynamic power booster comprising in combination:
   a. a crank lever having a first fixed pivot point and an associated power source for rotating said crank lever about said first pivot point;
   b. a crank pin connected to said crank lever end portion;
   c. a lever assembly having a first lever slideably connected by sliding means to a second lever;
   d. said first lever connected to said crank pin;
   e. a second fixed pivot point at said second lever and a sliding guide means positioned between said sliding means of said lever assembly and said second fixed pivot point;
   f. a one way clutch being a third fixed pivot point;
   g. an oscillating arm connected to said one way clutch at one end and arranged in cooperating connection with said sliding guide means at its other end;
   h. said sliding guide means having pin means for connection to said oscillating arm and shock absorbing means pivotally connected to said pin means and mounted on said oscillating arm for preventing a dead lock condition of said oscillating arm with said lever assembly; and
   i. an output shaft connected to said one way clutch; whereby upon activation of said associated power source said crank lever is rotated about said first fixed pivot point for extending and contracting said lever assembly by said crank pin in an oscillating movement about said second fixed pivot point thereby oscillating said oscillating arm through said sliding guide means about said one way clutch means for imparting an intermittent rotation to said output shaft having more torque than said associated power source input torque.

2. A dynamic power booster as claimed in claim 1 wherein said output shaft is provided with flywheel means or the like for converting said intermittent rotation into a continuous rotation.

3. A dynamic power booster as claimed in claim 1 wherein an additional sliding guide means is provided on said second lever opposite of said sliding guide means and separated in aligned arrangement and distance by said second fixed pivot point, and wherein an additional oscillating arm is connected to said additional sliding guide means and to an additional one way clutch forming a fourth fixed pivot point and being provided with an additional output shaft.

4. A dynamic power booster as claimed in claim 3 wherein said sliding guide means and said additional sliding guide means is provided with pin means and additional pin means respectively for connection to said oscillating arm and said additional oscillating arm, respectively, and wherein shock absorbing means are pivotally connected to said pin means and mounted on said oscillating arm, and wherein additional shock absorbing means are pivotally connected to said additional pin means and mounted on said additional oscillating arm so that a dead lock condition of said oscillating arm with said lever assembly and said additional oscillating arm with said lever assembly is prevented.

5. A dynamic power booster as claimed in claim 1 wherein said dynamic power booster is connected mechanically in series to form a plurality of dynamic power boosters, and wherein said first, second and third fixed pivot points are each congruently aligned and in parallel alignment with one another, and wherein each of said plurality of power boosters is connected at said first fixed pivot point at predetermined degrees of separation from one another, and wherein said output shaft of each said booster is integrally connected to a common output shaft for providing a continous high torque output rotation.

6. A dynamic power booster as claimed in claim 1 wherein said dynamic power booster is connected mechanically in combination with one or more of said dynamic power boosters congruently about said first fixed pivot point at predetermined degrees of separation.

* * * * *